(12) United States Patent
Stokkeland et al.

(10) Patent No.: US 9,846,249 B2
(45) Date of Patent: Dec. 19, 2017

(54) METHOD AND SYSTEM FOR ADJUSTING VESSEL TURN TIME WITH TENSION FEEDBACK

(71) Applicant: PGS Geophysical AS, Oslo (NO)

(72) Inventors: Jan Erik Stokkeland, Hornindal (NO); Mattias Dan Christian Oscarsson, Oslo (NO); Rune Tønnessen, Oslo (NO)

(73) Assignee: PGS Geophysical AS, Oslo (NO)

( * ) Notice: Subject to any disclaimer, the term of this patent is extended or adjusted under 35 U.S.C. 154(b) by 68 days.

(21) Appl. No.: 14/919,243

(22) Filed: Oct. 21, 2015

(65) Prior Publication Data

US 2016/0041282 A1     Feb. 11, 2016

Related U.S. Application Data

(63) Continuation of application No. 13/773,000, filed on Feb. 21, 2013, now Pat. No. 9,194,969.

(51) Int. Cl.
    *G01V 1/38*          (2006.01)

(52) U.S. Cl.
    CPC .......... *G01V 1/3826* (2013.01); *G01V 1/3808* (2013.01)

(58) Field of Classification Search
    CPC ..................... G01V 1/3826; G01V 1/3808
    USPC ...................................... 367/16, 17
    See application file for complete search history.

(56) References Cited

U.S. PATENT DOCUMENTS

| | | | |
|---|---|---|---|
| 6,877,453 | B2 | 4/2005 | Hocquet et al. |
| 7,142,481 | B1 | 11/2006 | Metzbower et al. |
| 7,156,035 | B2 | 1/2007 | Hocquet et al. |
| 7,221,619 | B1 | 5/2007 | George |
| 7,404,370 | B2 | 7/2008 | Stokkeland |
| 7,469,652 | B2 | 12/2008 | Kristiansen et al. |

(Continued)

FOREIGN PATENT DOCUMENTS

| | | |
|---|---|---|
| EP | 2360496 | 6/2011 |
| EP | 2360496 A1 † | 8/2011 |

(Continued)

OTHER PUBLICATIONS

French application FR 1350640 filed Jan. 24, 2013; 30 pages.*

(Continued)

*Primary Examiner* — Daniel L Murphy

(57) ABSTRACT

Disclosed are methods and systems for using tension feedback from steerable deflectors. In one example, a method may comprise: towing sensors streamers in a body of water from a survey vessel, wherein each of the sensor streamers comprises geophysical sensors at spaced apart locations; towing steerable deflectors in the body of water from the survey vessel, wherein the steerable deflectors are used to provide a lateral component of force to the sensors streamers as the steerable deflectors are towed through the body of water; turning the survey vessel; measuring tension at the steerable deflectors during the step of turning the survey vessel; and in response to the step of measuring tension, determining at least one of a reduced vessel operating speed, an increased vessel operating speed, a reduced angle of attack for at least one of the steerable deflectors, an increased angle of attack for at least one of the steerable, an increased vessel turn radius, or a decreased vessel turn radius.

30 Claims, 4 Drawing Sheets

(56) References Cited

U.S. PATENT DOCUMENTS

| | | | |
|---|---|---|---|
| 7,658,161 B2 | 2/2010 | Toennessen et al. | |
| 7,660,190 B2 | 2/2010 | Keskes et al. | |
| 7,778,109 B2 | 8/2010 | Storteig et al. | |
| 7,881,153 B2 | 2/2011 | Stokkeland et al. | |
| 8,267,031 B2 | 9/2012 | Austad et al. | |
| 8,335,126 B2 | 12/2012 | Sudow et al. | |
| 8,347,805 B2 | 1/2013 | Stokkeland et al. | |
| 8,752,493 B2 | 6/2014 | Oxseth et al. | |
| 9,228,912 B2 * | 1/2016 | Richer De Forges | G01L 5/103 |
| 2003/0060102 A1 | 3/2003 | Ambs | |
| 2003/0074978 A1 * | 4/2003 | Bermudez | B63H 9/06 73/828 |
| 2006/0191458 A1 * | 8/2006 | George | B63B 35/00 114/253 |
| 2008/0285381 A1 * | 11/2008 | Moldoveanu | G01V 1/3808 367/20 |
| 2009/0157242 A1 | 6/2009 | Holo et al. | |
| 2009/0316525 A1 | 12/2009 | Welker et al. | |
| 2011/0103179 A1 | 5/2011 | Vageskar et al. | |
| 2011/0158045 A1 | 6/2011 | Karlsen et al. | |
| 2011/0286302 A1 | 11/2011 | Welker et al. | |
| 2013/0010570 A1 | 1/2013 | Sudow et al. | |
| 2013/0010571 A1 | 1/2013 | Sudow et al. | |

FOREIGN PATENT DOCUMENTS

| | | | |
|---|---|---|---|
| EP | 2643203 | 3/2014 | |
| FR | 3001303 A1 * | 7/2014 | G01L 5/103 |
| GB | 2390904 | 1/2004 | |
| GB | 2488638 | 9/2012 | |
| NO | 331725 | 5/2012 | |
| WO | 2012/070952 A1 † | 5/2012 | |
| WO | 2012070952 | 5/2012 | |

OTHER PUBLICATIONS

Norwegian Search Report for Norwegian Application No. 20140218 dated Jan. 12, 2016.
Norway: Ulmatec Introduces New Baro DefCon System, Subsea World News, Oct. 5, 2011, available at http://subseaworldnews.com/2011/10/05/norway-ulmatec-introduces-new-baro-defon-syste/.
UK Search Report dated May 19, 2015, issued for application GB1401836.0, 2 pages.
UK Search Report dated May 23, 2014, issued for application GB1401836.0, 4 pages.
Notice of Allowance dated Jul. 22, 2015 for U.S. Appl. No. 13/773,000.
En gave til den seismiske industrien (A Gift to the Seismic Industry), p. 1, 19 (2 pages), Nov. 3, 2011, Moderne Shipping.†
Ulmatec Presents New Baro DefCon System, p. 1 (1 page), Oct. 5, 2011, Maritiem Nieuws.nl.†
Remote control reduces downtime, p. 1, 46 (2 pages), Nov./Dec. 6, 2011, Ship and Offshore, The International Publication for Offshore & Marine technology.†
Norway: Ulmatec Introduces New Baro DEfCon System, p. 1-2 (2 pages), Oct. 5, 2011, Subsea World News.†

\* cited by examiner
† cited by third party

METHOD AND SYSTEM FOR ADJUSTING VESSEL TURN TIME WITH TENSION FEEDBACK

CROSS-REFERENCE TO RELATED APPLICATIONS

The present applicant is a continuation of U.S. application Ser. No. 13/773,000, filed Feb. 21, 2013, the entire disclosure of which is incorporated herein by reference.

BACKGROUND

The present invention generally relates to marine geophysical surveying and, more particularly, in one or more embodiments, to methods and systems for using tension feedback from steerable deflectors to adjust vessel turn time.

Marine geophysical surveying systems such as seismic survey systems and electromagnetic survey systems may be used to acquire geophysical data from formations disposed below the bottom of a body of water, such as a lake or ocean. Such geophysical data may indicate geophysical structures and/or identify formations likely to contain useful materials, such as water, oil, or natural gas. Marine seismic surveying systems, for example, typically may include a seismic survey vessel having onboard navigation, seismic energy source control, and geophysical data recording equipment. The seismic survey vessel may be configured to tow a sensor streamer or more typically, a plurality of laterally spaced apart sensor streamers through the water at one or more selected depths. One or more deflectors may be positioned outside of the sensor streamers to generate lateral thrust for maintaining a desired lateral spacing of the sensor streamers. At selected times, the seismic energy source control equipment may cause one or more seismic energy sources (which may be towed in the water by the seismic vessel or by another vessel) to actuate. Signals generated by various sensors on the one or more streamers in response to detected seismic energy may be ultimately conducted to the recording equipment. A record can be made in the recording system of the signals generated by each sensor (or groups of such sensors). The recorded signals may be interpreted to infer the structure and composition of the formations below the bottom of the body of water. Corresponding components (transmitters and receivers) for inducing electromagnetic fields and detecting electromagnetic phenomena originating in the subsurface in response to such imparted fields may be used in marine electromagnetic geophysical survey systems.

While the sensor streamers and other equipment are deployed behind the survey vessel, the survey vessel may need to execute a turn. For example, one type of survey may comprise a grid of straight lines in opposing directions wherein the survey vessel is actively generating geophysical data while moving in the straight lines. Accordingly, a 180-degree turn may be executed so that the survey vessel can be positioned over the next line to be shot in the opposite direction. Another type of survey may execute continuous turns in a circular or spiral pattern. Due to the number and length of the sensor streamers towed from the survey vessel, however, turning may be a complex procedure. In some instances, for example, when the survey plan does not generate geophysical data during turns, it may be desired to reduce the turn time for the survey vessel.

A number of different techniques may be utilized to reduce the turn time. For instance, one technique may include keeping the turn radius constant and increasing speed of the survey vessel. Another technique may include reducing the turn radius and thus the distance traveled while keeping the speed constant. Yet another technique may include a combination of a reduction in turn radius and increased vessel speed. In all of these techniques, a limitation can be the tension on the deflector. As previously mentioned, deflectors may be positioned outside the sensors streamers to generate lateral force for maintaining a desired lateral spacing of the sensor streamers. During a turn, the outer deflector should experience an increase in tension while the inner deflector should experience a corresponding decrease in tension. However, to ensure stable deflector operation, the tension on the outer deflector should not exceed a maximum value, and the tension on the inner deflector should be kept above a minimum value. There exists a need to adjust turn time while maintain stable functioning of the deflectors.

BRIEF DESCRIPTION OF THE DRAWINGS

These drawings illustrate certain aspects of some of the embodiments of the present invention and should not be used to limit or define the invention.

DETAILED DESCRIPTION

The present invention generally relates to marine geophysical surveying and, more particularly, in one or more embodiments, to methods and systems for using tension feedback from steerable deflectors to adjust vessel turn time. One of the many potential advantages, only some of which are disclosed herein, is that tension on the steerable deflectors may be monitored such that the turning radius for the survey vessel may be reduced while maintaining stable deflector operation. It is believed that steerable deflectors have not been used in techniques for reducing or otherwise adjusting the vessel's turning radius. Reduction in the turning radius should reduce the time need for turning the survey vessel such that utilization and efficacy of the survey vessels can be maximized. Another potential advantage may be that tension in the lead-in lines for the steerable deflectors may be monitored thus giving a more precise indication of their wear such that the deflector lead-in lines may be used for extended period of time prior to their replacement and/or failure. Yet another potential advantage may be that towing parameters may be controlled and optimized both online and in turns by monitoring the actual load generated by the steerable deflectors.

Figure 1:
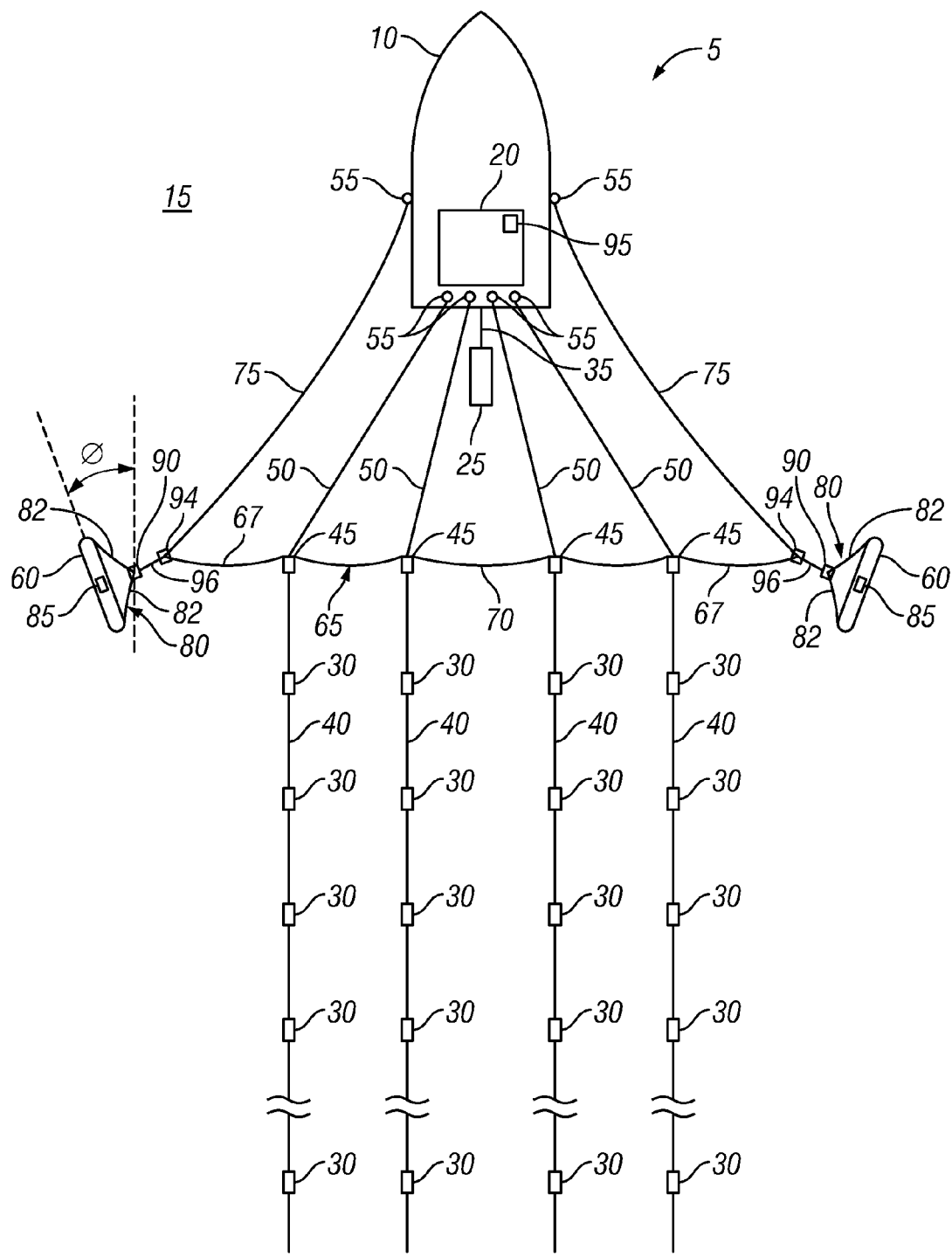
FIG. 1 illustrates an example embodiment of a geophysical survey system.

FIG. 1 illustrates a marine geophysical survey system 5 in accordance with embodiments of the present invention. In the illustrated embodiment, the marine geophysical survey system 5 may include a survey vessel 10 that moves along the surface of a body of water 15, such as a lake or ocean. The survey vessel 10 may include thereon equipment, shown generally at 20 and referred to for convenience as a "recording system." The recording system 20 typically includes devices (none shown separately) for navigating the survey vessel 10, such as global positioning system ("GPS") receivers, for actuating one or more energy sources 25, and for recording signals generated by geophysical sensors 30.

As illustrated, the survey vessel 10 or a different vessel (not shown) can tow a source cable 35 that includes one or more energy sources 25. The one or more energy sources 25 may be any selectively actuable sources suitable for subsurface geophysical surveying, including without limitation seismic air guns, water guns, vibrators or arrays of such devices, or one or more electromagnetic field transmitters. In some embodiments, seismic energy and/or electromagnetic energy may originate from the one or more energy sources 25. As the energy is emitted by the energy sources 25, it travels downwardly through the body of water 15 and rock formations (not shown) below the water bottom. It should be noted that, while the present example, shows only a single energy source 25, the invention is applicable to any number of energy sources towed by survey vessel 10 or any other vessel.

The geophysical survey system 5 may include a plurality of sensor streamers 40 towed by the survey vessel 10 (or another vessel) with each of the sensor streamers 40 including the geophysical sensors 30 at spaced apart locations. The sensor streamers 40 may be laterally spaced apart as shown by FIG. 1. "Lateral" or "laterally," in the present context, means transverse to the direction of the motion of the survey vessel 10. The sensor streamers 40 may each be formed, for example, by coupling a plurality of streamer segments end-to-end as explained in U.S. Pat. No. 7,142,481, the disclosure of which is incorporated herein by reference. The sensor streamers 40 may be coupled at their forward end (with respect to direction of movement of the survey vessel 10) to terminations 45 which couple the sensor streamers 40 to corresponding lead-in lines 50. Each of the lead-in lines 50 may be deployed from the survey vessel 10 by a winch 55 or other similar spooling device, for example, that can be used to control the deployed length of the lead-in lines 50. In one embodiment, the sensor streamers 40 may include lateral force and depth ("LFD") control devices (not shown) configured to, for example, regulate streamer depth so that the sensor streamers 40 may be kept at selected depth profiles (e.g., as level as possible or at a 30-degree from horizontal angle) while towed through the body of water 15. Each of the sensor streamers 40 may be towed at the same or different depths and with the same or different depth profiles. The LFD control devices may be any of a variety of different devices suitable for regulating streamer depth, including "birds" having variable-incidence wings. It should be noted that, while the present example, shows only four sensor streamers 40, the invention is applicable to any number of laterally spaced apart sensor streamers 40 towed by survey vessel 10 or any other vessel. For example, in some embodiments, eight or more laterally spaced apart sensor streamers 40 may be towed by survey vessel 10, while in other embodiments, up to twenty-six laterally spaced apart sensor streamers 40 may be towed by survey vessel 10.

The geophysical sensors 30 may be any type of geophysical sensor known in the art. Non-limiting examples of such sensors may include seismic sensors such as geophones, hydrophones, or accelerometers, or electromagnetic field sensors, such as electrodes or magnetometers. By way of example, the geophysical sensors 30 may generate response signals, such as electrical or optical signals, in response to detecting energy emitted from the one or more energy sources 25 after the energy has interacted with the rock formations (not shown) below the water bottom. Signals generated by the geophysical sensors 30 may be communicated to the recording system 20.

The geophysical survey system 5 may further include steerable deflectors 60 for maintaining the lateral position of the sensor streamers 40. In the illustrated embodiment, two steerable deflectors 60 are shown. The steerable deflectors 60 may each be configured to provide a lateral component of force as the deflectors 60 are moved through the water 15. By way of example, the steerable deflectors 60 may comprise one or more diverters or foils that redirect water as the steerable deflectors 60 are towed through the body of water 15. Such redirection of water results in lateral force being generated by the steerable deflectors 60. The lateral component of force of each steerable deflector 60 is generally opposite to that of the other steerable deflector 60. The combined lateral force component of the steerable deflectors 60 should separate the steerable deflectors 60 until they put in tension one or more spreader lines 65 that extend at least partially between the steerable deflectors 60. As illustrated, the spreader lines 65 may include, for example, outer spreader lines 67 and center portion 70. In general, the one or more spreader lines 65 may be configured to limit the lateral separation of the sensor streamers 40. As illustrated, the spreader lines 65 may be coupled at a forward end of the sensor streamers 40. The spreader lines 65 may be coupled at either end to the steerable deflectors 60. Other configurations may have steerable deflectors 60 on only one side of the survey vessel 10, may have two or more steerable deflectors 60 on each side of the survey vessel 10, or may exclude the center portion 70 of the one or more spreader lines 65. In one particular embodiment (not shown) multiple steerable deflectors 60 may be used with each steerable deflector 60 towed directly off one of the lead-in lines 50. Accordingly, the present invention is not intended to be limited to the example configuration illustrated on FIG. 1.

Non-limiting examples of suitable steerable deflectors 60 may include one-foil, two-foil, and multi-foil deflectors. Specific examples of suitable steerable deflectors are described in U.S. Pat. No. 7,404,370, the disclosure of which is incorporated herein by reference. In present embodiments, the steerable deflectors 60 may be considered "steerable" as the steerable deflectors 60 may include a steering device to adjust its angle of attack $\theta$ (the angle subtended by the longitudinal axis of the particular steerable deflector 60 with respect to the direction of motion of the survey vessel 10) to control the amount of lateral force generated by the deflector. The term "steering device" is intended to mean that the device cooperates with the steerable deflector 60 to change the angle of attack $\theta$. In general, an increase in the angle of attack $\theta$ should increase the resultant force (such as lateral and drag forces) and a decrease in the angle of attack $\theta$ should decrease the resultant force. By adjusting the angle of attack $\theta$ and thus the force generated by the steerable deflectors 60, the tension in the one or more spreader lines 65 may be controlled.

As illustrated, the steerable deflectors 60 may be coupled to the survey vessel 10 by deflector lead-in lines 75. The deflector lead-in lines 75 may be coupled to the survey vessel 10 at one end to a winch 55 or other suitable spooling device, for example, that can be used to change the deployed length of the lead-in lines 75. As illustrated, each deflector lead-in line 75 may be coupled to the corresponding outer spreader line 67. There may be a connection point 94 at the intersection of the corresponding outer spreader line 67 and deflector lead-in lines 75. A relatively short line (referred to herein as lever arm 96) may extend from this connection point 94 to the particular steerable deflector 60. The lever arms 96 may be the same line as, or a different than, the corresponding deflector lead-in line 75. As illustrated, each of the lever arms 96 may be coupled to the corresponding steerable deflector 60 by a set of cables referred to herein as a "bridle" and shown generally at 80.

In accordance with present embodiments it may be beneficial to measure the force generated by the steerable deflectors 60. As will be discussed in more detail below, the force or a corresponding indication thereof may be used in a process to adjust turn time for the survey vessel 10. In the illustrated embodiment, the force generated by each steerable deflector 60 is generally taken by the corresponding lever arm 96. The resulting force may be re-distributed between the corresponding deflector lead-in line 75 and outer spreader line 67, with the re-distribution changing during a turn as compared to towing in a straight line. Accordingly, an indication of the force may be generated by measuring tension in the rope or wires coupled to the steerable deflectors 60, such as the lever arms 96, the deflector lead-in lines 75, and the outer spreader lines 67. This tension in the rope or wires coupled to the steerable deflectors 60 is referred to herein as tension on the steerable deflectors 60 even where the measured tension may not represent the full tension on the steerable deflectors 60 such as where tension is measured on the outer spreader lines 67 or the deflector lead-in lines 75, which may not receive the full deflector tension.

In some embodiments, the geophysical survey system 5 may further include tension measurement systems 85 configured to measure tension and report the measured tension to the recording system 20. In one particular embodiment, the measured tension may be reported to control system 95, for example, shown on FIG. 1 as a component of the recording system 20. In response to the measured tension, the control system 95 may operate, for example, to calculate a reduced or increased vessel operating speed, calculate a reduced or increased angle of attack for the steerable deflectors 60, or calculate a reduced or increased vessel turn radius. As illustrated, there may be a tension measurement system 85 associated with each of the steerable deflectors 60. In the illustrated embodiment, the tension measurement systems 85 may be coupled to or otherwise integrated into the steerable deflectors 60. The tension measurement systems 85 may be configured to measure tension at the intersection of the lever arm 96 and the bridle legs 482. In alternative embodiments, the tension measurement systems 85 may measure tension at the connection points between the steerable deflectors 60 and each bridle leg 82. If measured at such connection points, the measured tension will need to be summed for each steerable deflector 65 to obtain a total tension. In yet further embodiments, the tension measurement systems 85 may measure tension on the lever arms 96, on the deflector lead-in lines 75, or on the one or more spreader lines 65.

At least one tension sensor 90 may be associated with each of the tension measurement systems 85. The tension sensor 90 may be electrical strain gauges or load cell sensors, such as Wheatstone bridge type sensors. The tension sensor 90 may also be optical sensors, such as Bragg gratings etched into an optical fiber. Optical strain gauges as applied to marine geophysical survey systems are explained in U.S. Pat. No. 7,221,619, the disclosure of which is incorporated herein by reference. The tension sensor 90 may also be hydrostatic pressure sensors such as piezoelectric type sensors. The tension sensor 90 may also be disposed in a pressure vessel integrated into in the line to which the tensions sensors are coupled, in modules that connect the axial ends of adjacent lines, or integrated into strain members 26, or another suitable configuration. As illustrated, the tension sensor 90 may be incorporated into the lever arm 96 for each of the deflector lead-in lines 75 with the lever arm 96 being the portion of the corresponding deflector lead-in line 75 (or being a separate line) that extends beyond the connection point 94 of the corresponding outer spreader line 67 and deflector lead-in line 75. More particularly, the tension sensor 90 may be disposed at the intersection of the lever arm 96 and the bridle legs 82. Other configurations may have the tension sensor 90 incorporated into other portions of the deflector lead-in lines 75 or lever arm 96 or incorporated into the bridle 80. In any event, the tension sensor 90 may be positioned such that it is able to measure tension representing the tension at one of the steerable deflectors 60. Accordingly, the present invention is not intended to be limited to the example configuration for the tension measure systems 85 and the tension sensors 90 illustrated on FIG. 1.

While the preceding description describes use of tension measurement systems 85 to measure the tension, embodiments also may employ indirect techniques for determining approximate tension or equivalent force at the steerable deflectors 60 that can then be used in turn optimization. These indirect techniques may be based, for example, on the relationship between the deflector force (lift plus drag) that is resulting in tow cable tension, water speed, and deflector angle of attack. These relationships may be known from deflector design, such as testing of a pilot deflector equipped with measuring equipment. One example technique for indirect tension measurement may include measuring water speed (e.g., fluid flow relative to deflector) and deflector angle of attack, e.g., by a Doppler log with minimum two beams. In an embodiment, by measuring the water velocity vector relative to the deflector both the water speed and the deflector angle of attack may be measured in one measurement. Other instruments may also be used that can measure the water vector directly, e.g., instruments based on stagnation pressure (e.g., Pitot tube). Another example technique for indirect measurement may include measuring speed of the steerable deflectors 60 (not the water speed vector), for example, by measuring the water speed and measuring deflector orientation using the assumption that deflector orientation represents deflector angle of attack. A number of techniques may be used to measure water speed, including use of a water speed instrument (e.g., one beam Doppler log, Pitot tube, or other suitable water speed instrument), application of global positioning system speed, or estimation of deflector speed from vessel speed and applicable turn radius. A number of different techniques may be used to determine deflector orientation, including a compass, two global positioning systems, two acoustical nodes, or other suitable means.

Figure 2:
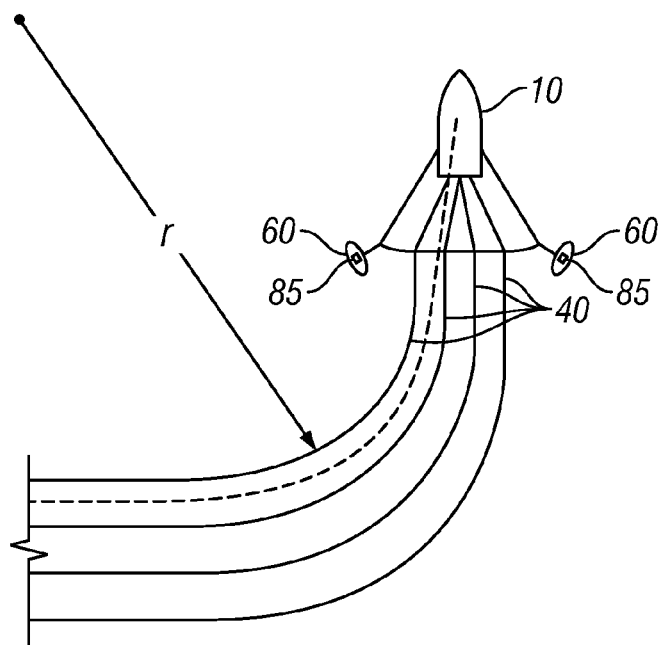
FIG. 2 illustrates an example embodiment of the geophysical survey system of FIG. 1 executing a turn.

FIG. 2 illustrates the survey vessel 10 of FIG. 1 executing a port turn in accordance with embodiments of the present invention. In some embodiments, the port turn may be executed so that the survey vessel 10 may be positioned over the next line to be shot. By way of example, this may be desirable when the survey plan comprise a grid of straight lines in opposing directions wherein geophysical data may be actively generated while moving in straight lines. In alternative embodiments, the survey vessel 10 may execute a turn (e.g., the port turn) so that the sensor streamers 40 may be advanced along a curved path while obtaining geophysical data. For example, the survey vessel 10 may execute a continuous turn which may be in a circular or spiral pattern to advance the sensor streamers in a curved path. While FIG. 2 illustrates a port turn, it should be understood that embodiments of the present invention may also be applicable during execution of a starboard turn by the survey vessel 10.

As illustrated, the port turn for the survey vessel 10 may have a turn radius of r. As previously mentioned, reducing the turn radius (r) for the survey vessel 10, such as the turn radius (r) for the port turn shown on FIG. 2, can reduce the turn time for the survey vessel 10. Reducing turn time can be important to maximize the utilization and efficiency of the survey vessel 10, among other things. However, a limitation on the reduction in the turning radius (r) for the survey vessel 10 may be tension on the steerable deflectors 60. For example, if the turning radius (r) is reduced too much, the tension on the one of the steerable deflectors 60 on the inner or port side of the survey vessel 10 may decrease in an amount that could make operation of such deflector unstable. For example, the steerable deflector 60 on the inner side of the survey vessel 10 in a turn may function unacceptably wherein waves or other ocean currents can change the deflector orientation with the steerable deflector 60 even starting to move backwards in some instances. Similarly, the tension on the other steerable deflector 60 on the starboard or outer side of the survey vessel 10 may increase in an amount that would make operation of such deflector unstable. For example, increased tension can increase the risk of equipment failure such as rope or deflector breakage. In accordance with present embodiments, the tension monitoring systems 85 may be used to provide an indication of tension generated on the steerable deflectors 60 such that a turn, such as the port turn shown on FIG. 2, may be safely executed with stable deflector operation and while staying within certain design force limitations.

Figure 3:
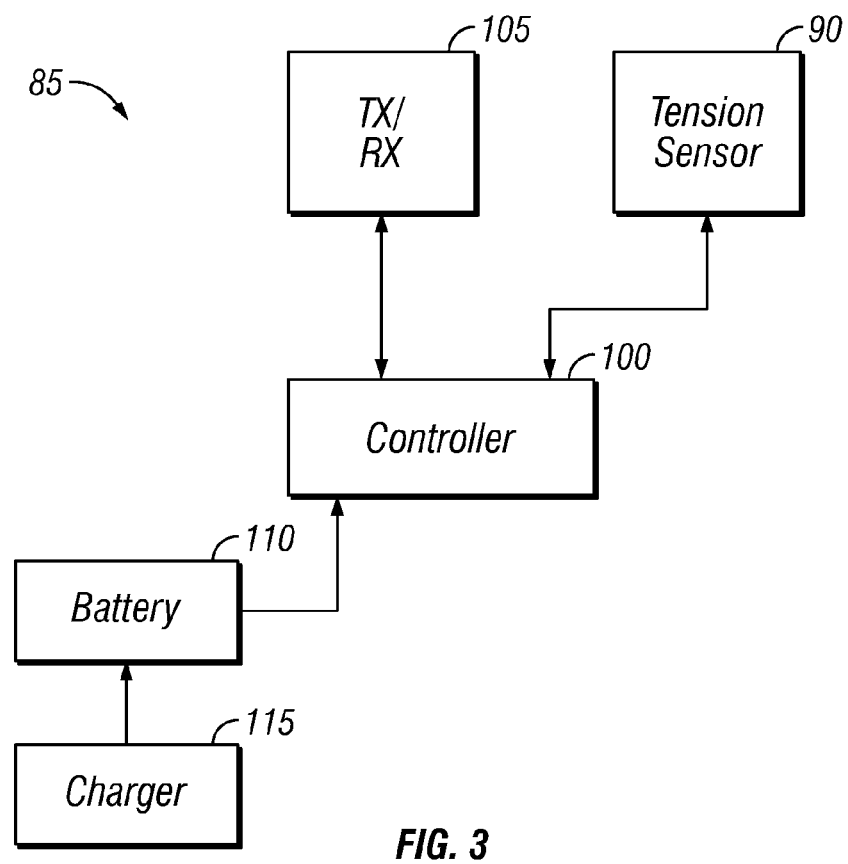
FIG. 3 illustrates an example embodiment of a tension measurement system that may be used to measure tension on one or more deflectors in a geophysical survey system.

FIG. 3 illustrates one embodiment of a tension measurement system 85 referred to with reference to FIGS. 1 and 2. In the illustrated embodiment, the tension measurement system 85 may comprise the components needed to measure tension on one or more lines (e.g., ropes, wires, cables, etc.) coupled to the steerable deflectors 60 and report the measured tension, for example, to the control system 95 (e.g., shown on FIG. 1). As illustrated, the tension measurement system 85 may comprise a tension sensor 90. The tension sensor 90 may be used to measure tension at a specified location, for example, on a particular steerable deflector 60. The measured tension from the tension sensors 90 may be conducted to a controller 100, which may be, for example, any microprocessor-based controller, programmable logic controller, or similar device. The controller 100 may be coupled to a telemetry transceiver 105. The telemetry transceiver 105 may send the measured tension received by the controller 100 to the recording system 20 (e.g., shown on FIG. 1) on the survey vessel. In some embodiments, the measured tension may be sent to the control system 95 (e.g., shown on FIG. 1), which may be a component of the recording system 20. The telemetry receiver 105 may also receive signals sent from the control system 95 in the recording system 20. The signals received by the telemetry receiver 105 may be conducted to the controller 100. The controller 100 may receive, for example, set points for deflector angle of attack θ or sensor calibration data. In some embodiments, the controller 100 may receive the desired tension, and the tension measurement system 85 can then adjust the angle of attack θ based on measured values and control logic to stay within the desired tension. In some embodiments, tension control may be considered a "closed loop" wherein the angle of attack θ may be actively adjusted to maintain a set tension value.

As illustrated, a battery 110 may be used to provide power (e.g., uninterrupted power) to the controller 100 and other components in the tension monitoring system 85. A generator 115 may be used to supply electrical power to the battery 110 to keep the battery 110 charged. In some embodiments, the generator 115 may supply power to the battery 110 when the generator 115 is moved through the body of water 15 (e.g., shown on FIGS. 1 and 2).

Figure 4:
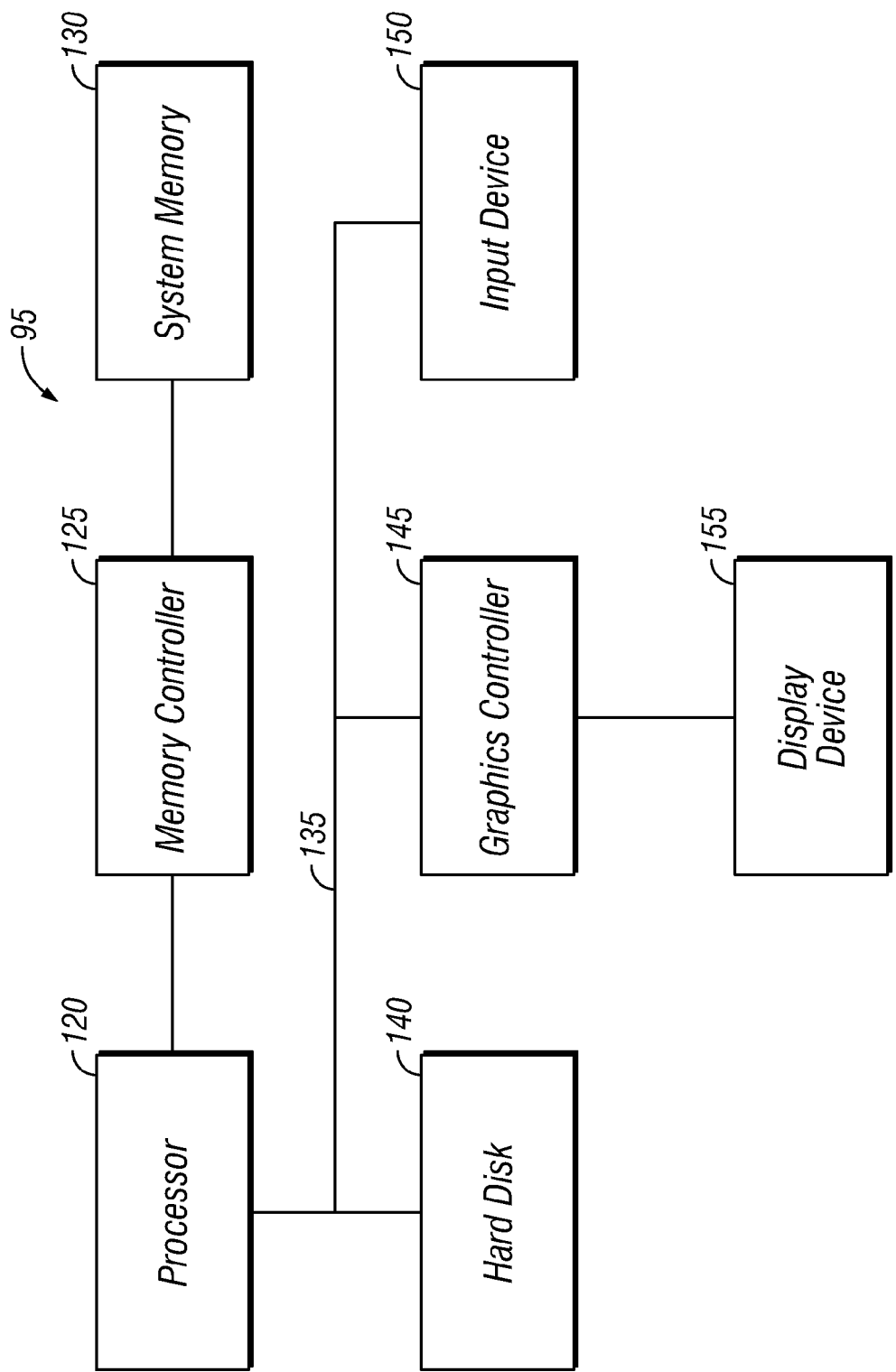
FIG. 4 illustrates an example embodiment of a control system that may be used in an example method for adjusting vessel turn time.

FIG. 4 illustrates one embodiment of a control system 95 referred to with reference to FIGS. 1-3. As previously mentioned, the control system 95 may receive tension measurements, for example, from the tension measurement systems 85 (e.g., shown on FIGS. 1-3). The control system 95 may also receive as inputs the maximum operating tension, minimum operating tension, vessel speed, and/or angle of attack θ. Using these inputs, the control system 95 may determine and transmit an adjusted vessel speed (which may be an optimum vessel speed), adjusted angle of attack θ for the steerable deflector, and/or adjusted vessel turn radius (r). In some embodiments, the control system 95 may receive and display the measured tension, allowing the operator to reduce or increase vessel speed, for example. Special or unique software for receiving the inputs and sending output signals may be stored in the control system 95 and/or on external computer readable media. Those of ordinary skill in the art will appreciate that the control system 95 may comprise hardware elements including circuitry, software elements including computer code stored on a machine-readable medium or a combination of both hardware and software elements. Additionally, the blocks shown on FIG. 4 are but one example of blocks that may be implemented. A processor 120, such as a central processing unit or CPU, may control the overall operation of the control system 95. The processor 120 may be connected to a memory controller 125, which reads data to and writes data from a system memory 130. The memory controller 125 may have memory that includes a non-volatile memory region and a volatile memory region. The system memory 130 may be composed of a plurality of memory modules, as will be appreciated by one of ordinary skill in the art. In addition, the system memory 130 may include non-volatile and volatile portions. A system basic input-output system (BIOS) may be stored in a non-volatile portion of the system memory 130. The system BIOS is adapted to control a start-up or boot process and to control the low-level operation of the control system 95.

The processor 120 may be connected to at least one system bus 135 to allow communication between the processor 120 and other system devices. The system bus 135 may operate under a standard protocol such as a variation of the Peripheral Component Interconnect (PCI) bus or the like. In the exemplary embodiment shown in FIG. 4, the system bus 135 connects the processor 120 to a hard disk drive 140, a graphics controller 145 and at least one input device 150. The hard disk drive 140 provides non-volatile storage to data that is used by the computer system. The graphics controller 145 is in turn connected to a display device 155, which provides an image to a user based on activities performed by the control system 95. The memory devices of the control system 95, including the system memory 130 and the hard disk 140 may be tangible, machine-readable media that store computer-readable instructions to cause the processor 120 to perform a method according to an embodiment of the present techniques.

An example method for using tension feedback from steerable deflectors 60 to reduce vessel turn time will now be described with reference to FIGS. 1 and 2. The method may include towing a plurality of sensor streamers 40 behind a survey vessel 10 in a body of water 15. The method may further include using steerable deflectors 60 for maintaining lateral position of the sensor streamers 40 in the body of water. At a desired time, the survey vessel 10 may need to execute a turn in the body of water 15. As described above, it may be desirable to reduce the time needed for execution of the turn. FIG. 2 illustrates a port turn. Those of ordinary skill in the art will appreciate that the turn time may be reduced by either increasing vessel speed or by reducing turn radius (r). With either approach, tension generated by the steerable deflectors 60 can be a limiting factor. However, since tension increases faster with increased speed than with reduced turn radius (r), reducing the turn radius (r) can be a more effective technique than increasing vessel speed for reducing turn time.

Because tension at the steerable deflectors 60 is a limiting factor, embodiments of the method may include determining the maximum tension on the steerable deflector 60 on the outside of the turn and/or determining the minimum tension on the steerable deflector 60 on the inside of the turn. As will be understood by those of ordinary skill in the art with the benefit of this disclosure, the maximum and minimum tensions may be determined based on a number of factors, including sea state, load-limiting factors associated with the towing equipment, and weather forecast, among others. The maximum tension will be higher for flat seas as opposed to choppy seas. Each element in the spread (e.g., deflectors, ropes, cables, etc.) has a given design limit when it comes to tolerated load. For the steerable deflectors 60, there are also limitations—particular to each deflector type—when it comes to behavior. Acceptance criteria for behavior as well as static/dynamic loads (tension) can be experienced based, from testing and/or calculated by using hydrodynamic simulations.

In addition to the maximum and minimum tension for the steerable deflectors 60, embodiments of the method may also include determining the maximum and minimum angle of attack $\theta$ for each of the steerable deflectors 60. Too large of an angle of attack $\theta$ may cause the particular steerable deflector 60 to stall and, for example, fall backward into the spread of sensor streamers 40. Too small of an angle of attack $\theta$ may cause the particular steerable deflector 60 to become unstable and, for example, flip over such that the generated lateral force is switched 180° or potentially even causing the steerable deflector 60 to move backwards. The maximum and minimum angle of attack $\theta$ for each of the steerable deflectors may be determined based on a number of factors, including experience, controlled testing in full scale or in model scale, or by numerical hydrodynamic simulations, or a combination of these techniques.

As previously mentioned, embodiments of reducing turn time may most effectively be done by reducing turn radius (r). A turn radius (r) may be determined so that a calculated tension on the steerable deflector 60 on the inside of the turn may be greater than the minimum tension, and tension on the steerable deflector 60 on the outside of the turn may be less than the maximum tension. The determined turn radius (r) may be less than a safe turn radius (r) at the same vessel speed without use of steerable deflectors 60. The angle of attack $\theta$ on one or more of the steerable deflectors 60 may need to be adjusted to maintain the tensions inside the desired values as adjusting angle of attack should adjust lift force with tension being a combination of lift force and drag. Since the configuration of the particular steerable deflectors 60 are known, it will be known what tension may be for a particular vessel speed and angle of attack $\theta$ and how turn radius (r) impacts tension. Accordingly, a turn radius (r) for a particular vessel speed may be selected from a set of possible angle of attack and turn radius (r) combinations. The vessel turn radius (r) may be set to the turn radius (r) that is selected. With the turn radius (r) selected, further adjustments to control tension on the steerable deflectors 60 may be selected from vessel speed and angle of attack $\theta$. Alternatively, for certain types of turns, turn radius (r) may not need to be constant such that the selected turn radius (r) may be a range of effective turn radiuses at which the tension may be acceptable. Embodiments of the method may further comprise adjusting the angle of attack $\theta$ for the steerable deflector 60 on the inside of the turn and/or for the steerable deflector 60 on the outside of the turn. This adjustment may be performed prior to or during the turn. This adjustment may also be performed at the end of the turn to get back to normal for a straight ahead setting. In some embodiments, the angle of attack $\theta$ for the inside steerable deflector 60 may be increased to increase lift force and thus increase tension. In some embodiments, the angle of attack $\theta$ for the outside steerable deflector 60 may be decreased to decrease lift force and thus decrease tension. As a result, the spread of the sensor streamers 40 may shift to the center of the turn relative to the survey vessel 10 while allowing the survey vessel 10 to maintain its speed while keeping acceptable tension on the steerable deflectors 60. In some embodiments, tension may be monitored during the turn to ensure that the tension on the steerable deflectors 60 is maintained within the minimum tension for the inside steerable deflector 60 and the maximum tension for the outside steerable deflector 60. If tension is outside these ranges, vessel speed may be adjusted (e.g., decreased to reduce tension or increased to increase tension) as needed to maintain the desired tension. In some embodiments, adjusting vessel speed may be desired as to adjust of turn radius (r) during the turn as controlling tension by adjusting turn radius (r) during the turn may have a slow response. In some embodiments, the angle of attack $\theta$ may also be adjusted to maintain the desired tension.

Figure 5:
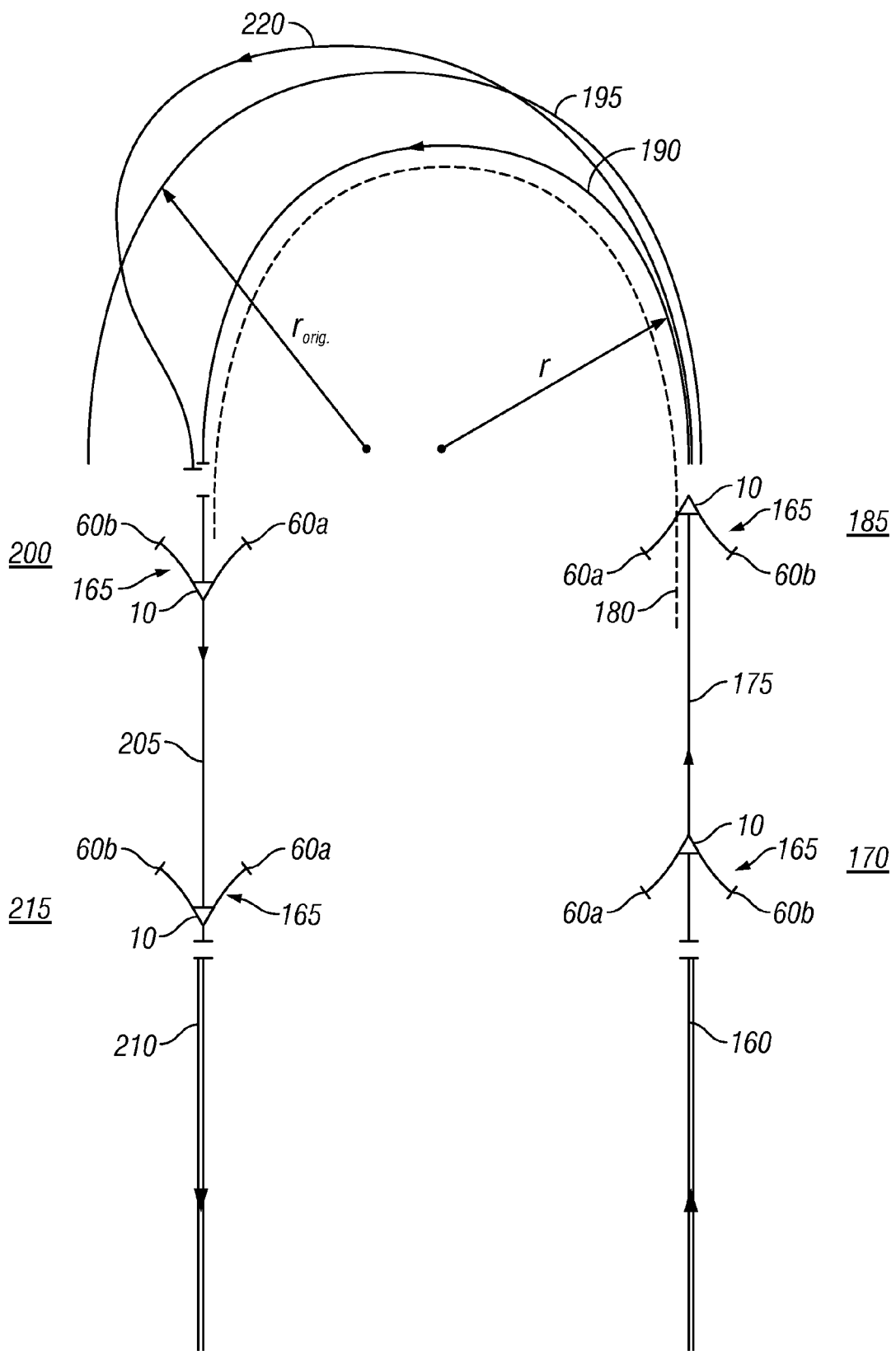
FIG. 5 illustrates another example embodiment of the geophysical survey system of FIG. 1 executing a turn.

FIG. 5 illustrates another embodiment of the survey vessel 10 of FIG. 1 executing a port turn having a reduced turn radius (r). For simplicity, the associated sensors streamers 40 and energy sources 25 of FIG. 1 are not shown on FIG. 5. As illustrated, the survey vessel 10 may be heading in a first direction along first survey line 160. In accordance with present embodiments, a desired turn radius (r) may be selected for the port turn. The desired turn radius (r) may be smaller than the turning radius ($r_{orig}$) for a survey vessel 10 without steerable deflectors 60a, 60b. When the survey vessel 10 leaves the survey line 160, the steerable deflectors 60a, 60b and corresponding spread 165 of towed equipment (e.g., sensors streamers 40, energy sources 25, etc.) may be symmetric about first survey line 160 as best seen at position 170 on FIG. 5. As the survey vessel 10 leaves the first survey line 160, the survey vessel 10 travels along run-out line 175. On the run-out line 175, it may be desired to prepare the spread 165 for the turn, for example, by adjusting the angle of attack of the steerable deflectors 60a, 60b to shift the spread 165 into the turn. For example, the inner steerable deflector 60a may be turned up so that it may be at a higher angle and experience more force in the turn, and the outer steerable deflector 60b may be turned down so that it may be at a lower angle and experience less force in the turn. As a result, the steerable deflectors 60a, 60b and associated spread 165 may shift inward. Accordingly, as the survey vessel 10 enters the turn, the steerable deflectors 60a, 60b and corresponding spread lines 65 may be symmetric about symmetry line 180 and not run-out line 175, as best seen at position 185 shown on FIG. 5. Symmetry line 180 may be inside the run-out line 175 and vessel turn path 190. During the turn, vessel speed and other variables may be adjusted as discussed in more detail above. As seen on FIG. 5, the vessel turn path 190 using the steerable deflectors 60a, 60b results in a shorter distance of travel for survey vessel 10 when executing the turn than for a survey vessel 10 executing the same turn without steerable deflectors 60a, 60b, whose turn path is shown on FIG. 5 at reference number 195. As shown on FIG. 5, as the survey vessel 10 comes out of the turn, the steerable deflectors 60a, 60b and associated spread 165 may still be shifted inward as best seen at position 200. As the survey vessel 10 follows run-out line 205 heading out of the turn, the steerable deflectors 60a, 60b may be adjusted to shift the steerable deflectors 60a, 60b and associated spread 165 outward, for example, to be symmetric about second survey line 210 as best seen at position 215. The survey vessel 10 may then continue the geophysical survey heading in a second direction (which may be opposite the first direction) along the second survey line 210. Also shown on FIG. 5 is teardrop turn 220. Teardrop turn 220 may be executed by survey vessel 10 in embodiments wherein the turning radius (r) is non-constant with turning radius (r) being selected from a range of acceptable radii. As previously discussed, the vessel speed and angle of attack for the steerable deflectors 60a, 60b may also be adjusted to maintain tension within safe limits Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted for the purposes of understanding this invention.

What is claimed:

1. A method comprising:
    towing sensors streamers in a body of water from a survey vessel, wherein each of the sensor streamers comprises geophysical sensors at spaced apart locations;
    towing steerable deflectors in the body of water from the survey vessel, wherein the steerable deflectors are used to provide a lateral component of force to the sensors streamers as the steerable deflectors are towed through the body of water;
    turning the survey vessel in the body of water;
    measuring tension at the steerable deflectors during the step of turning the survey vessel;
    determining a maximum, tension for at least one of the steerable deflectors, and selecting radius of turn and speed of the survey vessel for the step of turning the survey vessel such that the measured tension on a corresponding one of the steerable deflectors does not exceed the maximum tension; and
    in response to the step of measuring tension, determining at least one of a reduced vessel operating speed, an increased vessel operating speed, a reduced angle of attack for at least one of the steerable deflectors, an increased angle of attack for at least one of the steerable deflectors, an increased vessel turn radius, or a decreased vessel turn radius.

2. The method of claim 1 wherein the step of measuring tension at the steerable deflectors comprises measuring tension on one or more lines coupled to each of the steerable deflectors.

3. The method of claim 1 wherein a bridle is coupled to each of the steerable deflectors between the corresponding steerable deflector and a lever arm for a corresponding deflector lead-in line, wherein the step of measuring tension at the steerable deflectors comprises measuring tension at an intersection of the bridle and the lever arm for each of the steerable deflectors.

4. The method of claim 1 wherein each of the steerable deflectors is coupled to a bridle that comprise bridle legs, wherein the step of measuring tension at the steerable deflectors comprises measuring tension at connections points between each of the bridle legs and the corresponding steerable deflector, wherein the measured tension at each of the connections points is summed to determine a total tension for each of the steerable deflectors.

5. The method of claim 1 further comprising increasing speed of the survey vessel to maintain tension on at least one of the steerable deflectors at a value that is greater than a minimum tension for that particular steerable deflector.

6. The method of claim 1 further comprising decreasing speed of the survey vessel to maintain tension on at least one of the steerable deflectors at a value that is less than a maximum tension for that particular steerable deflector.

7. The method of claim 1 further comprising increasing an angle of attack of at least one of the steerable deflectors to maintain tension on the particular one of the steerable deflectors at a value that is greater than a minimum tension for that particular one of the steerable deflectors.

8. The method of claim 1 further comprising decreasing an angle of attack of at least one of the steerable deflectors to maintain tension on the particular one of the steerable deflectors at a value that is less than a maximum tension for that particular one of the steerable deflectors.

9. The method of claim 1 further comprising adjusting a turn radius of the survey vessel in response to the step of measuring tension.

10. The method of claim 1 wherein the step of measuring tension comprises using at least one tension sensor selected from the group consisting of an electrical strain gauge, a load cell sensor, a Wheatstone bridge type sensor, an optical sensor, a Bragg gratings etched into an optical fiber, a hydrostatic pressure sensor, a piezoelectric type sensor, and any combination thereof.

11. The method of claim 1 further comprising actuating one or more energy sources towed by the survey vessel, and recording signals detected by the geophysical sensors.

12. The method of claim 11 wherein actuating the one or more energy sources comprises emitting seismic energy.

13. The method of claim 11 wherein the one or more energy sources are activated during the step of turning the vessel such that the survey vessel advances the sensor streamers attached to the survey vessel in a curved path while obtaining geophysical data.

14. The method of claim 1 wherein each of the steerable deflectors comprises a multi-foil deflector.

15. A marine geophysical survey system comprising:
sensor streamers, wherein each of the sensor streamers comprises geophysical sensors at spaced apart locations;
steerable deflectors coupled to the sensor streamers, wherein the steerable deflectors are configured to maintain lateral separation of the sensor streamers as the steerable deflectors are towed through a body of water;
tension measurement systems, wherein each of the tension measurement systems is configure to measure tension at a corresponding one of the steerable deflectors; and
a control system configured to (i) receive the measured tension from the tension measurement systems during a turn of a survey vessel, (ii) in response to the measured tension, determine at least one of a reduced vessel operating speed, an increased vessel operating speed, a reduced angle of attack for at least one of the steerable deflectors, an increased angle of attack for at least one of the steerable deflectors, an increased vessel turn radius, or a decreased vessel turn radius, and (iii) determine vessel turn radius and vessel speed such that the measured tension on a corresponding one of the steerable deflectors does not exceed a pre-determined maximum tension and/or is not less than a predetermined minimum tension.

16. The system of claim 15 wherein the geophysical sensors comprise at least one sensor selected from the group consisting of a geophone, a hydrophone, an accelerometer, an electromagnetic field sensor, and any combination thereof.

17. The system of claim 15 wherein the tension measurement systems each comprise at least one tension sensor selected from the group consisting of an electrical strain gauge, a load cell sensor, a Wheatstone bridge type sensor, an optical sensor, a Bragg gratings etched into an optical fiber, a hydrostatic pressure sensor, a piezoelectric type sensor, and any combination thereof.

18. The system of claim 17 wherein the tension measurement systems each further comprise a controller, a telemetry receiver configured to transmit the measured tension to the control system, and a battery.

19. The system of claim 15 wherein the tension measurement systems are each configured to adjust an angle of attack of the corresponding one of the steerable deflectors in response to the measured tension.

20. The system of claim 15 wherein the tension measurement systems each comprise at least one tension sensor that measures tension at a connection point interconnecting a respective one of the steerable deflectors and a bridle leg for the respective steerable deflector.

21. The system of claim 15 wherein the tension measurement systems each comprise at least one tension sensor that measures tension at an intersection of a bridle for a corresponding one of the steerable deflectors and a lever arm for a corresponding deflector lead-line.

22. The system of claim 15 wherein the control system is configured to increase speed of the survey vessel to maintain tension on at least one of the steerable deflectors at a value that is greater than a minimum tension for that particular steerable deflector.

23. The system of claim 15 wherein the control system is configured to decrease speed of the survey vessel to maintain tension on at least one of the steerable deflectors at a value that is less than a maximum tension for that particular steerable deflector.

24. The system of claim 15 wherein the control system is configured to increase an angle of attack of at least one of the steerable deflectors to maintain tension on the particular one of the steerable deflectors at a value that is greater than a minimum tension for that particular one of the steerable deflectors.

25. The system of claim 15 wherein the control system is configured to decrease an angle of attack of at least one of the steerable deflectors to maintain tension on the particular one of the steerable deflectors at a value that is less than a maximum tension for that particular one of the steerable deflectors.

26. The system of claim 15 wherein the control system is configured to adjust a turn radius of the survey vessel in response to the measured tension.

27. The system of claim 15 wherein the control system is configured to display the measured tension.

28. The system of claim 15 wherein each of the steerable deflectors comprises a multi-foil deflector.

29. A method comprising:
towing sensor streamers in a body of water from a survey vessel, wherein each of the sensor streamers comprises geophysical sensors at spaced apart locations;
towing steerable deflectors in the body of water from the survey vessel, wherein the steerable deflectors are used to provide a lateral component of force to the sensor streamers as the steerable deflectors are towed through the body of water;
turning the survey vessel in the body of water;
measuring tension at the steerable deflectors during the step of turning the survey vessel;
adjusting a turn radius of the survey vessel in response to the step of measuring tension; and
in response to the step of measuring tension, determining at least one of a reduced vessel operating speed, an increased vessel operating speed, a reduced angle of attack for at least one of the steerable deflectors, an increased angle of attack for at least one of the steerable deflectors, an increased vessel turn radius, or a decreased vessel turn radius.

30. A marine geophysical survey system comprising:
sensor streamers, wherein each of the sensor streamers comprises geophysical sensors at spaced apart locations;
steerable deflectors coupled to the sensor streamers, wherein the steerable deflectors are configured to maintain lateral separation of the sensor streamers as the steerable deflectors are towed through a body of water;
tension measurement systems, wherein each of the tension measurement systems is configure to measure tension at a corresponding one of the steerable deflectors; and
a control system configured to (i) receive the measured tension from the tension measurement systems during a turn of a survey vessel, (ii) in response to the measured tension, determine at least one of a reduced vessel operating speed, an increased vessel operating speed, a reduced angle of attack for at least one of the steerable deflectors, an increased angle of attack for at least one of the steerable deflectors, an increased vessel turn radius, or a decreased vessel turn radius, and (iii) adjust a turn radius of the survey vessel in response to the measured tension.

* * * * *